(12) United States Patent
Padula, II et al.

(10) Patent No.: US 10,427,461 B1
(45) Date of Patent: Oct. 1, 2019

(54) RADIALLY STIFFENED SHAPE MEMORY ALLOY TIRE

(71) Applicant: United States of America as represented by the Administrator of NASA, Washington, DC (US)

(72) Inventors: Santo A. Padula, II, North Olmsted, OH (US); James Benzing, North canton, OH (US); Colln M. Creager, Columbia Station, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 72 days.

(21) Appl. No.: 15/599,527

(22) Filed: May 19, 2017

Related U.S. Application Data (63) Continuation-in-part of application No. 15/370,322, filed on Dec. 6, 2016.

(60) Provisional application No. 62/266,183, filed on Dec. 11, 2015, provisional application No. 62/339,353, filed on May 20, 2016.

(51) Int. Cl.
| | |
|---|---|
| *B60C 7/06* | (2006.01) |
| *B60C 7/14* | (2006.01) |
| *B60B 21/10* | (2006.01) |
| *C22F 1/00* | (2006.01) |
| *C22C 19/03* | (2006.01) |

(52) U.S. Cl.
CPC .............. *B60C 7/06* (2013.01); *B60B 21/104* (2013.01); *B60C 7/14* (2013.01); *C22C 19/03* (2013.01); *C22F 1/006* (2013.01)

(58) Field of Classification Search
CPC ......... B60C 7/14; B60B 21/104; C22C 19/08; C22F 1/006
USPC ........................................................... 152/12
See application file for complete search history.

(56) References Cited

U.S. PATENT DOCUMENTS

| | | |
|---|---|---|
| 581,008 A | 4/1897 | Payette |
| 1,101,702 A | 6/1914 | Lakoff |
| 1,106,238 A | 8/1914 | Papadopoulos |
| 1,191,894 A | 7/1916 | Hart |
| 1,195,049 A | 8/1916 | Lynn |
| 1,228,010 A | 5/1917 | Firestone |
| 1,378,246 A | 5/1921 | Compe |
| 1,390,948 A | 9/1921 | Woodward |
| 1,418,258 A | 5/1922 | Hayden |
| 1,424,468 A | 8/1922 | Garden |
| 1,472,918 A | 11/1923 | Lamb |
| 1,692,711 A | 11/1928 | Swartz |
| 2,317,218 A | 4/1943 | Pezzella |
| 2,331,024 A | 10/1943 | Griffith |
| 2,912,032 A | 11/1959 | Alexander |
| 3,182,705 A | 5/1965 | Markow |
| 3,493,027 A | 2/1970 | Dewhirst et al. |
| 3,568,748 A | 3/1971 | Calandro et al. |
| 3,698,461 A | 10/1972 | Markow |

(Continued)

*Primary Examiner* — S. Joseph Morano
*Assistant Examiner* — Jean W Charleston
(74) *Attorney, Agent, or Firm* — Robert H. Earp, III; William M. Johnson (57) ABSTRACT

A tire having a plurality of shape memory alloy (SMA) radial stiffening elements including a first end portion, a second end portion, and an arching middle portion. Each SMA radial element is secured to the rim of a wheel to form arching elements extending about an entire circumference of the tire.

20 Claims, 7 Drawing Sheets

(56) References Cited

U.S. PATENT DOCUMENTS

| | | | |
|---|---|---|---|
| 5,242,002 A | 9/1993 | Oku | |
| 6,237,663 B1 | 5/2001 | Cipparrone et al. | |
| 6,554,039 B1 | 4/2003 | Riva et al. | |
| 6,842,671 B2 | 1/2005 | Tropper | |
| 7,537,034 B2* | 5/2009 | Zabaleta | B60B 3/002 |
| | | | 152/396 |
| 8,141,606 B2 | 3/2012 | Benzing, II et al. | |
| 8,631,844 B2* | 1/2014 | Anderfaas | B60B 9/04 |
| | | | 152/69 |
| 8,931,531 B2* | 1/2015 | Kubeck | B60C 7/20 |
| | | | 152/250 |
| 8,950,451 B2* | 2/2015 | Abe | B60C 7/18 |
| | | | 152/12 |
| 2011/0024010 A1* | 2/2011 | Browne | B60C 11/00 |
| | | | 152/209.5 |
| 2014/0203623 A1 | 7/2014 | Parness et al. | |

\* cited by examiner

RADIALLY STIFFENED SHAPE MEMORY ALLOY TIRE

CROSS-REFERENCE TO RELATED APPLICATIONS

This application claims the benefit of U.S. Provisional Patent Application Ser. No. 62/339,353 entitled "Radially Stiffened Superelastic Tire" filed on May 20, 2016. This application is also a Continuation-in-Part application of and claims priority to U.S. patent application Ser. No. 15/370,322 entitled "Superelastic Tire" filed on Dec. 6, 2016, which claims the benefit of U.S. Provisional Patent Application Ser. No. 62/266,183 entitled "Superelastic Tire" filed on Dec. 11, 2015. The entirety of each above-noted application is incorporated by reference herein.

ORIGIN OF THE INVENTION

The invention described herein was made by employees of the United States Government and may be manufactured and used by or for the Government for Government purposes without the payment of any royalties thereon or therefor.

The invention described herein was made in the performance of work under NASA contract NNX07A016A and is subject to the provisions of Section 305 of the National Aeronautics and Space Act of 1958, Pub. L. 111-314 (124 Stat. 3339; 51 U.S.C. 20135).

BACKGROUND

The original pneumatic tire was developed in 1888 based on the observation that a flexible tire that conforms to the ground does not lose as much energy to vertical motion as a rigid wheel. There is a net energy savings when the tire contours to variations in topography as compared to simply driving over them. This feature also provides a smoother ride in a vehicle equipped with such a tire. However, because of their reliance on a constant air pressure, pneumatic tires suffer from efficiency loss due to pressure changes, and are prone to going flat when punctured. More recently, various non-pneumatic tire concepts have been developed. These non-pneumatic tires are typically limited in their ability to conform to the terrain without damage.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In one aspect, the innovation disclosed herein comprises a tire having a plurality of shape memory alloy (SMA) radial stiffening elements as the load carrying members. As compared to other non-pneumatic tire designs, the SMA radial stiffening elements allow for increased deformation without permanent damage to the tire and enables off-road and off-planet vehicles to travel at faster speeds without excessive impact force on the vehicle.

In one embodiment, the shape memory alloy may include NiTi, NiTiX (where X is a ternary alloying addition such as Hf, Zr, Au, Ag, Pt, Pd, Fe, etc.), NiTiXY (where X and Y are ternary and quaternary alloying additions similar to above), Ag—Cd, Au—Cd, Cu—Al—Ni, Cu—Sn, Cu—Zn, Cu—Zn—X (where X is a ternary alloying addition such as Si, Al, Sn, etc.), Fe—Pt, Mn—Cu, Fe—Mn—Si, Co—Ni—Al, Co—Ni—Ga, Ni—Fe—Ga, Ti—Nb, β-Ti alloys, or ternary alloys or quaternary alloys of the shape memory alloy. In one embodiment, the shape memory alloy is NiTi and its derivatives.

In another aspect, the innovation comprises a configuration of SMA radial stiffening elements to increase the load carrying capacity of a tire. In one embodiment, the number, diameter (gauge), and/or placement of SMA radial stiffening elements may be varied to provide a tire having the desired qualities. For example, the number of SMA radial stiffening elements can be increased to increase the load carrying capacity of the tire.

In another aspect, the innovation disclosed herein comprises shape memory alloy radial stiffening elements that may be used in mobility elements including, but not limited to belting elements for non-pneumatic or pneumatic tires.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein (e.g., thickness, orientation, configuration, etc.), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., are shown or described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Non-pneumatic compliant tire designs that use conventional materials are limited in the loads that can be imparted without incurring permanent deformation. In the past, several types of resilient mechanisms have been invented to reduce or eliminate the need for air in tires. One such concept is the Spring Tire described in U.S. Pat. No. 8,141,606, which is hereby incorporated in its entirety, that uses coiled spring steel wires woven into a flexible mesh to enable the tire carcass to deflect, thereby isolating the vehicle from motion and increasing net traction potential. These elastic materials only tolerate a maximum of 0.4% strain before plastically deforming and permanently changing the tire shape. As described in U.S. patent application Ser. No. 15/370,322, which is hereby incorporated in its entirety, Superelastic Spring Tires, made with SMAs, extended the ability of Spring Tires to allow for full reversibility after carcass distortion but suffered from limitations on the maximum amount of load that the tires were capable of supporting. In addition, present tire designs in general restrict the speed at which vehicles can travel off-road or off-planet, because they impart excessive force to the vehicle during high deformation impacts. Spring Tires made from shape memory alloys (SMAs) overcome the issues with permanent deformation and high launch forces but, due to the structural nature of the individual elements, are difficult to design for high load carrying capability.

In one aspect of the innovation, the radially stiffened tire uses a plurality of shape memory materials instead of traditional elastic-plastic materials as the load carrying members. This change results in increased deformation without permanent damage, and enables off-road and off-planet vehicles to travel at faster speeds without excessive impact force on the vehicle. This innovation improves the viability of non-pneumatic tires as an alternative to pneumatic tires. Pneumatic tires suffer from puncture failures, while non-pneumatic compliant tires do not. The increased use of non-pneumatic compliant tires, based on this innovation, would therefore improve automobile safety.

This technology may enable the development of commercial non-pneumatic tires, based on its ability to support high loads and significant deformation without damage. In addition, this invention may inspire the use of shape memory alloys to replace the steel belts commonly used in traditional pneumatic tires, in order to increase their robustness and design space, as well as enable alternate designs through the utilization of the unique properties that shape memory alloys afford.

The innovative radially stiffened SMA tire overcomes a number of the above design limitations associated with the spring tire, including SMA spring tires, as well as other non-pneumatic tires, and significantly improves the design flexibility and load-carrying capabilities of structurally supported tires. The radially stiffened SMA tire of the innovation utilizes shape memory alloys (SMAs) as radial arch members instead of spring elements to support load. The radial elements allow for both more design flexibility as well as improved manufacturability while taking advantage of the strain capability associated with shape memory alloy materials. The radial elements can also be designed with varying degrees of hardening character allowing different spring rates to be achieved within the same design. The ability to tailor this spring rate and, thus, force response optimizes performance while simultaneously protecting the vehicle from damage.

According to an aspect of the innovation, a plurality of shape memory alloy radial stiffening elements (e.g., NiTi and its derivatives) are used to increase the amount of load carrying potential while not sacrificing the highly deformable nature associated with shape memory alloy designs, which can undergo extremely large deformations without incurring plastic deformation. In one embodiment, this is accomplished by replacing the spring elements that were used for load carrying in the Spring Tire design with radial elements (e.g., hoop stiffeners) made from shape memory alloys. The utilization of shape memory alloys (e.g., NiTi) according to the innovation yields designs that are virtually impervious to plastic deformation. In one embodiment, the radially stiffened shape memory alloy tires may be capable of incurring strains of at least about 03%, at least about 1%, at least about 2%, at least about 3%, at least about 4%, or at least about 5%. In one embodiment, the radially stiffened shape memory alloy tires may be capable of incurring strains on the order of about 0.5% to about 15%, about 1% to about 12%, or about 4 to about 10%. By comparison, commonly used elastic-plastic materials (e.g. spring steels, composites, etc.), can only be subjected to strains on the order of up to about 0.4% before incurring plastic deformation. In addition, the utilization of shape memory alloys in the form of radial stiffeners as opposed to springs provides both increased load carrying potential and improved design flexibility, as well as tremendous weight savings.

A number of material systems that include an SMA can be used to form a tire according to the innovation. Materials suitable for use include: NiTi, NiTiX (where X is a ternary alloying addition such as Hf, Zr, Au, Ag, Pt, Pd, Fe, etc.), NiTiXY (where X and Y are ternary and quaternary alloying additions similar to above), Ag—Cd, Au—Cd, Cu—Al—Ni, Cu—Sn, Cu—Zn, Cu—Zn—X (where X is a ternary alloying addition such as Si, Al, Sn, etc.), Fe—Pt, Mn—Cu, Fe—Mn—Si, Co—Ni—Al, Co—Ni—Ga, Ni—Fe—Ga, Ti—Nb, β-Ti alloys, or ternary alloys or quaternary alloys of the shape memory alloy. In one embodiment, certain β-Ti alloys that produce significant amounts of reversible strain could be used in place of the common SMA materials. In one embodiment, the radial element comprises NiTi or its derivatives.

According to an aspect of the innovation, each SMA radial element includes a first end portion, a second end portion, and an arching middle portion. In one embodiment, the first end portion and the second end portion are secured to the rim of a wheel to form arching elements extending about an entire circumference of the tire.

According to an aspect of the innovation, the SMA radial element may possess various effects to accommodate a wide variety of different needs for a radially stiffened SMA tire. Shape memory in the SMA radial element may be induced thermally (i.e., it operates in a martensite phase) or mechanically (i.e., it operates in an austenite phase). In one embodiment, the SMA radial element may be an induced thermally and display a shape memory effect (SME). In one embodiment, the shape memory effect of the SMA radial element may be induced mechanically. In another embodiment, the mechanically induced SMA radial element may be used to form a tire that displays pseudoelasticity or superelasticity.

In one embodiment, the placement of the first end portion and the second end portion in relation to each other (e.g., directly opposite or at an angle) and/or the placement of a SMA radial element in relation to other SMA radial elements defines a pattern that in turn defines characteristics of the tire. The ends of each SMA radial elements may connect to the tire and/or wheel in any plane to accommodate the load carrying needs of the tire.

In one embodiment, the use of multiple sets or layers of SMA radial elements along the rim can create the effect of multiple plies in a tire, based on the relative placement. This can also be used to add lateral stiffness to the tire carcass.

In order to maintain the position and orientation of the SMA radial elements, and to add torsional stiffness to the tire, a flexible construct (e.g., a spring mesh, a rubber casing, etc.) is used into which each radial element is woven or embedded. This flexible construct can be made from variety of materials or patterns, depending on the application. The flexible construct itself can also serve as the traction elements (e.g., in extreme environments where polymers cannot be used) or custom traction elements can be added to provide optimal traction for a given situation. Because the traction elements, i.e. "treads" are not integral to the overall structure of the tire, they can easily be replaced as needed.

According to an aspect of the innovation, the tire may accommodate a wide variety of needs. For example, the tire may be designed for high load carrying capabilities for a light vehicle for extraterrestrial use (e.g., for a capacity of at least 100 lbs per tire) or for a heavy vehicle for terrestrial use (e.g., for a capacity of at least 3000 lbs per tire) by modifying characteristics of the radial elements. In one embodiment, the diameter of the radial element may be varied so as to achieve a desired load carrying capacity. The larger the diameter of the radial element, the greater the load carrying capacity. In another embodiment, the number of radial elements can be varied to achieve a desired load carrying capacity. In yet another, the arch of the radial element and/or the overall design placement (e.g., the geometry/effective length of the elements) of the radial element may be varied so as to achieve a desired load carrying capacity. It will be appreciated that a tire according to the innovation may be designed to have the correct number, size, and/or configuration of SMA radial elements to accommodate any reasonable load capacity.

In one embodiment, the SMA radial element may be subjected to treatment(s) to favorably alter characteristics of the SMA radial element (e.g., heat treatment, aging treatment, etc.). For example, an aging treatment could be applied to a Ni-rich shape memory alloy used for the SMA radial elements. This aging treatment produces precipitates within the otherwise solid-solution matrix that increases the strength, onset stress and/or hardening character of the resulting material used for the radial elements, which in turn allows for increased load carrying capacity for a tire using said material. Hence, utilization of this and/or various 'shape setting' treatments, wherein the resulting material is constrained and heat-treated to temperatures above 200° C. but below 600° C., depending on the alloy being used, allow for the optimal microstructures and internal stress states to be formed within the material. Such treatments allow for complete control over the resulting material properties, which in turn affects load carrying capability/potential.

Figure 1:
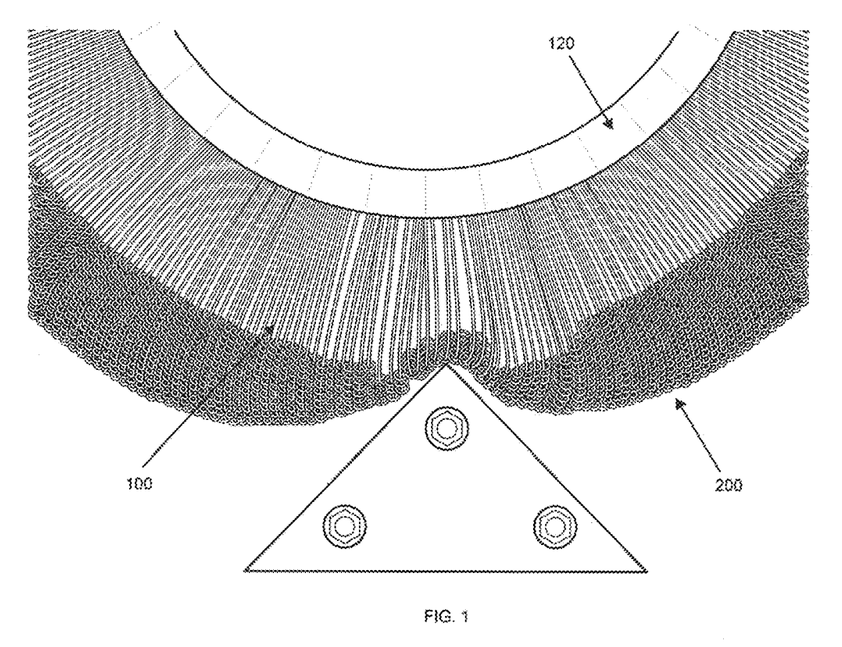
FIG. 1 is a photograph depicting an example of a tire having shape memory alloy radial elements according to the innovation.
Figure 2:
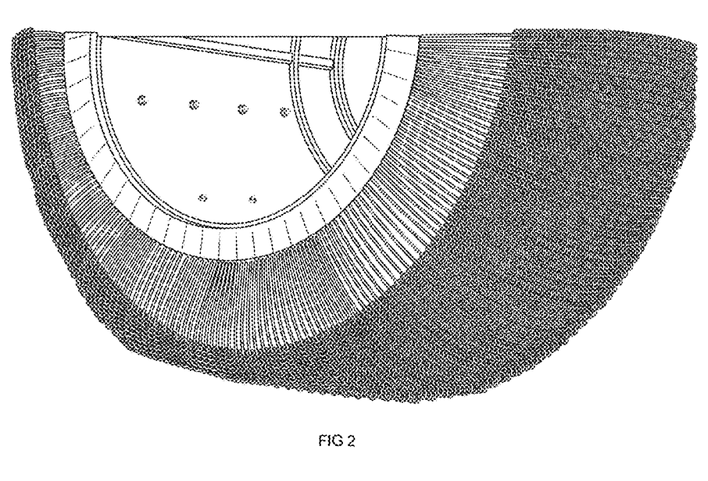
FIG. 2 is a photograph depicting another example of a tire having shape memory alloy radial elements according to the innovation.
Figure 3:
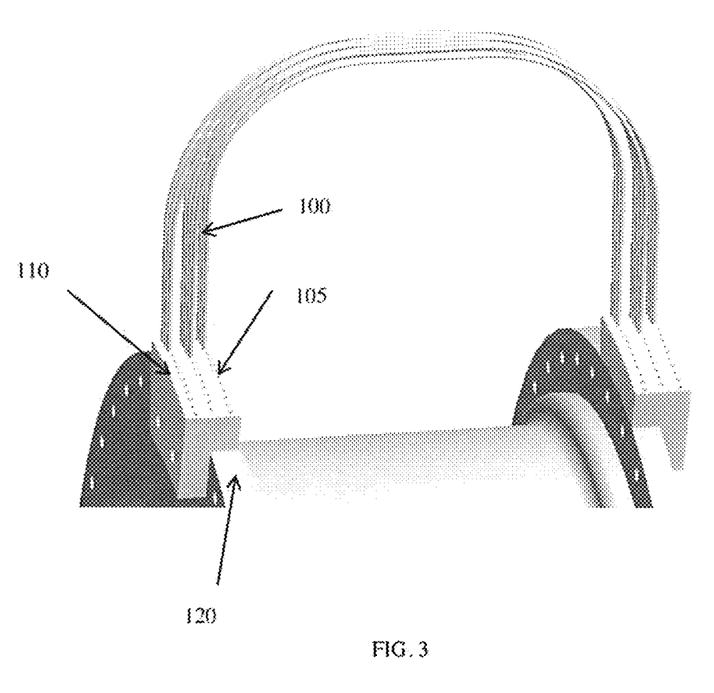
FIG. 3 is a schematic view of the placement of the shape memory alloy radial elements according to an embodiment the innovation.
Figure 4:
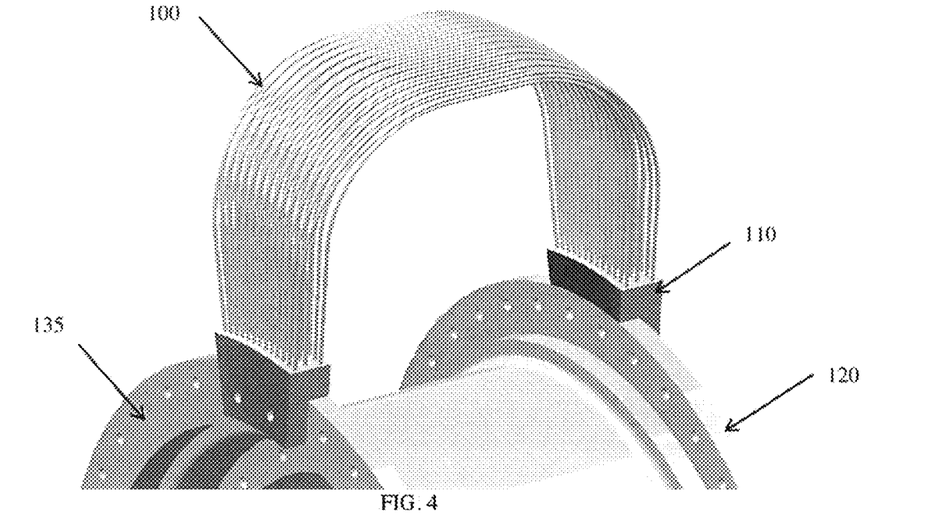
FIG. 4 is a schematic view of an example section of shape memory alloy radial elements according to an embodiment the innovation.
Figure 5:
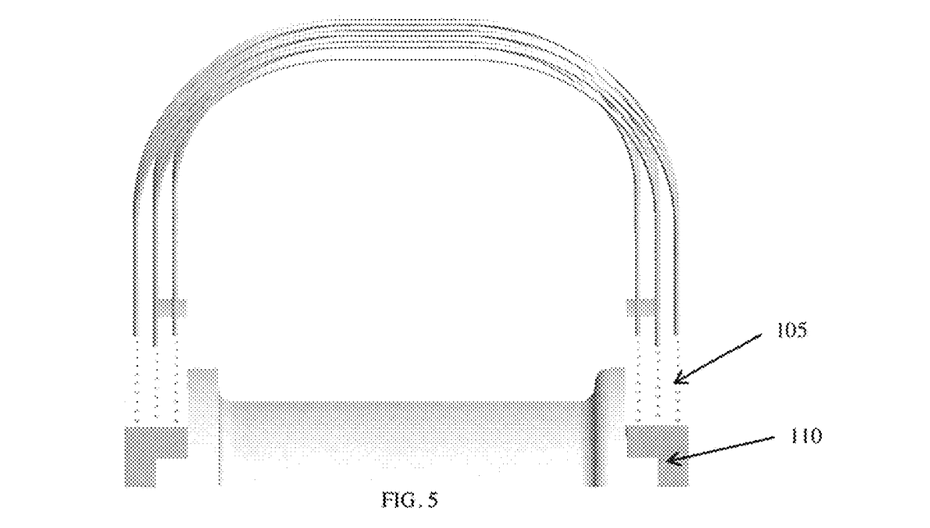
FIG. 5 is a schematic of another view of the placement of the shape memory alloy radial elements according to an embodiment the innovation.
Figure 6:
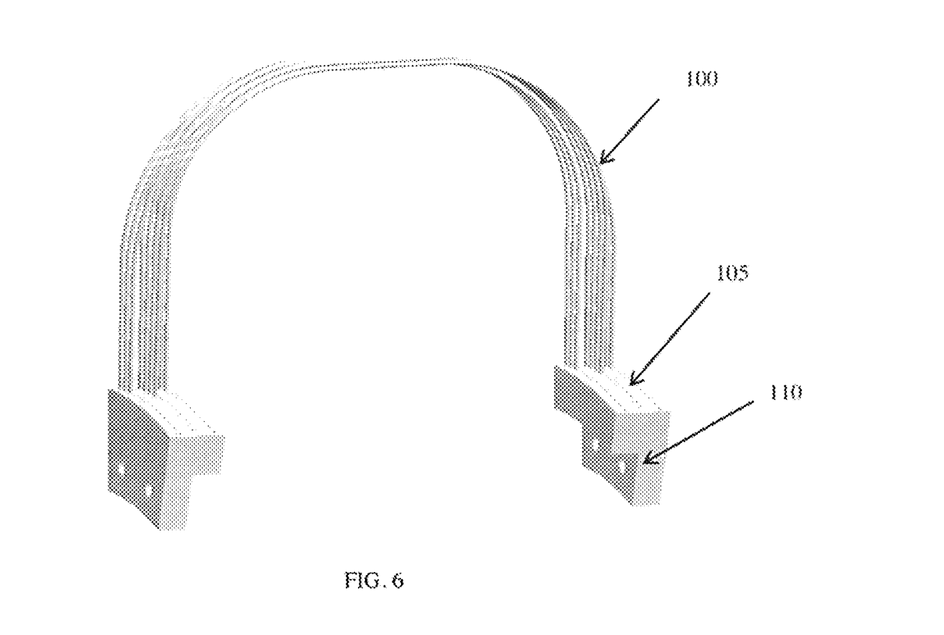
FIG. 6 is a schematic of the mounting block and shape memory alloy radial elements according to an embodiment of the innovation.
Figure 7:
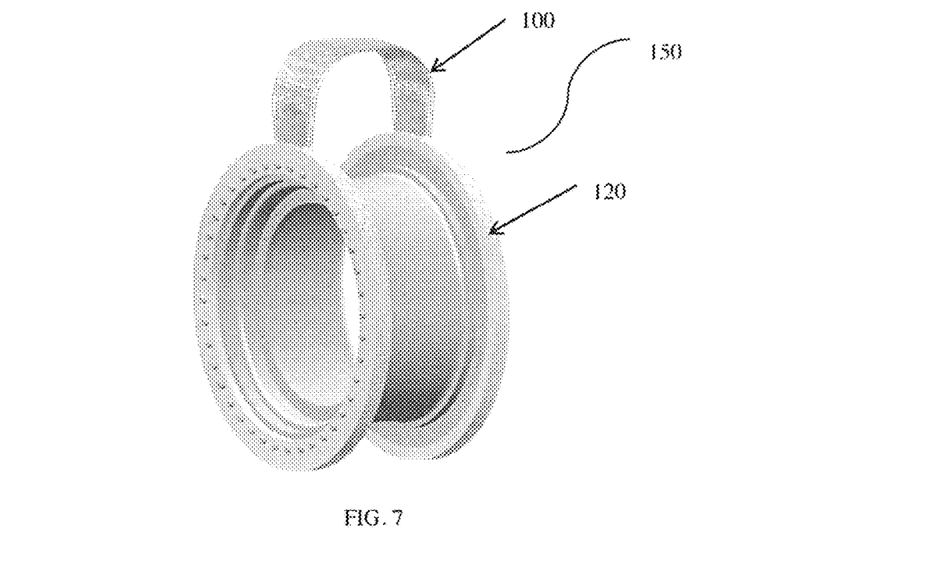
FIG. 7 is a schematic of a wheel and shape memory alloy radial elements according to an embodiment of the innovation.
Figure 8:
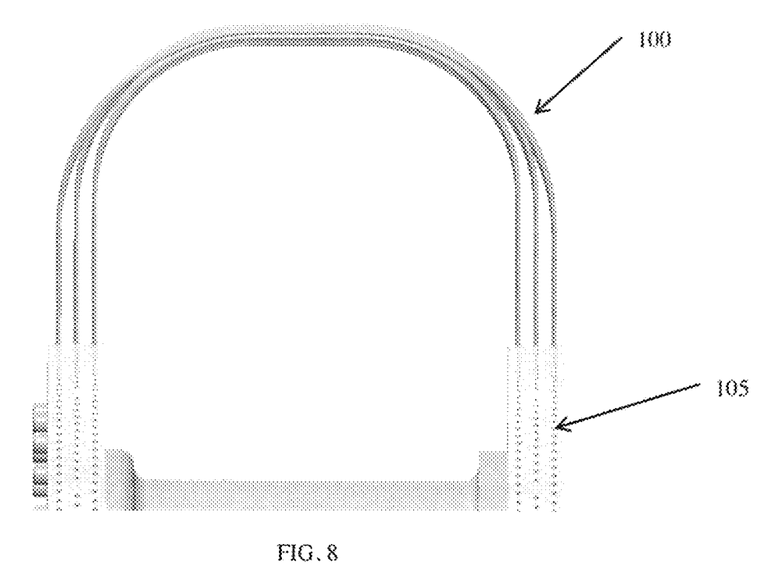
FIG. 8 is a schematic of a view of the placement of the shape memory alloy radial elements according to an embodiment of the innovation.
Figure 9:
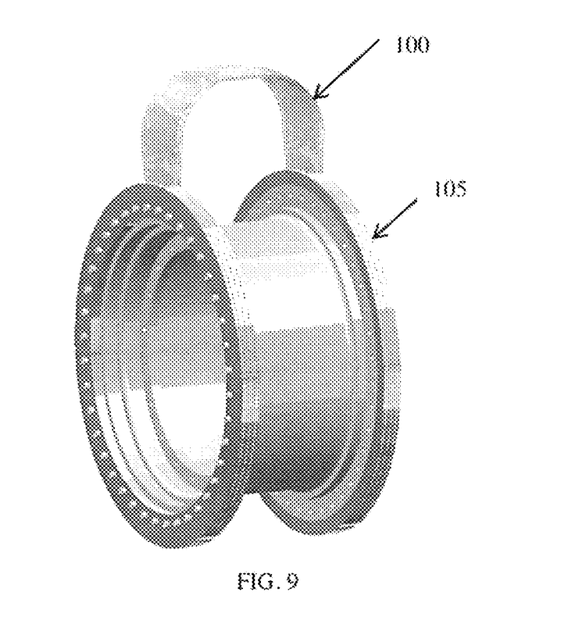
FIG. 9 is a schematic of a wheel and shape memory alloy radial elements according to an embodiment of the innovation.
Figure 10:
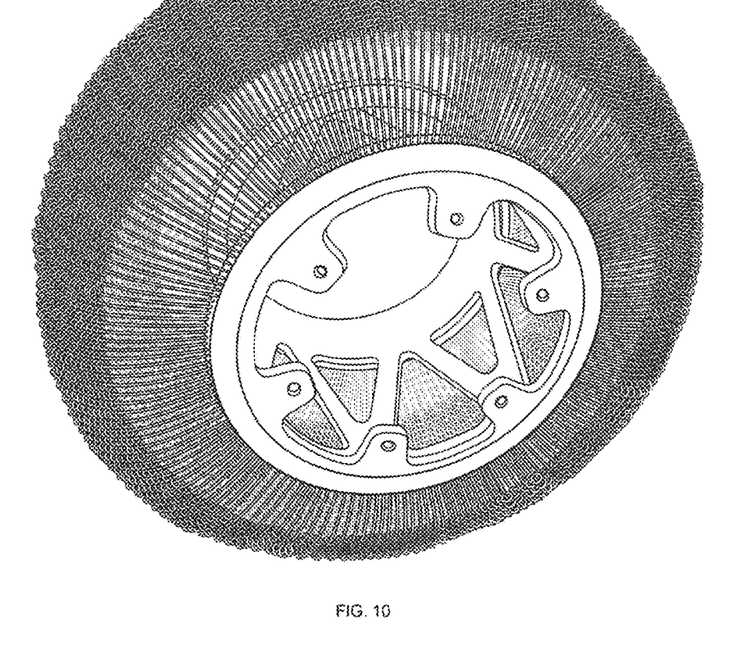
FIG. 10 is a photograph of an example of a wheel and tire assembly having the shape memory alloy radial elements according to the innovation.

Referring now to the drawings, FIGS. 1 and 2 are photographs depicting examples of tires having a plurality of shape memory alloy radial elements according to the innovation. In these examples, the SMA radial elements 100 are attached to a mounting block 110. The mounting block 110 is attached to the wheel rim 120. Several mounting blocks 110, each receiving a plurality of SMA radial elements 100, are mounted around the entire circumference of the wheel rim 120, forming the tire. A flexible construct (e.g., a spring mesh) 200 is attached to the structure formed by the SMA radial elements. FIG. 10 is a photograph depicting an example of a wheel and tire assembly where the tire is formed from the SMA radial elements 100 of the innovation.

The SMA radial element of the innovation may be secured to form a tire by any reasonable means or method. For example, the SMA radial elements may be inserted or integrally formed with a mounting block. In one embodiment, the mounting block may be attached to the rim of the tire before or after the SMA radial element is inserted or attached to the mounting block. In one embodiment, the tire comprising the SMA radial elements is separate from the wheel and may be secured to the wheel when needed.

In an embodiment the SMA radial elements of the shape memory alloy may be connected directly to the wheel, bypassing the use of mounting blocks for the rim. In this embodiment, the innovation comprises a tire and wheel assembly that includes the SMA radial elements.

According to an embodiment of the innovation, an external covering of some kind (e.g., a tread) may be included to generate traction, to protect the SMA radial elements, and/or to change the tire's dimensions. The flexible construct 200 (e.g., spring mesh) itself can also serve as the tread, as is in the case in FIGS. 1, 2, and 10. In one embodiment, the SMA radial elements 100 may be connected via springs to create traction. In another embodiment, the SMA radial elements 100 may be encompassed by a coating (e.g., a rubber coating) to form the tire.

FIGS. 3-9 are schematic representations of the SMA radial elements 100 of the innovation and show different views and attachments for the SMA radial elements. It will be understood that the schematics depicted in the figures are examples only and that any means of attaching or securing the SMA radial elements to form a tire or structure for forming a tire is encompassed by the present innovation.

According to the embodiments depicted in FIGS. 3-9, the SMA radial elements 100 may be secured via holes 105 in a mounting block 110 that is secured to or a part of a wheel rim 120. The wheel 150 has an annular rim 120 at each axial side for securing the tire 140 to the wheel 150. Each rim 120 is fixed relative to the other rim 120. Each rim 120 may include socket holes 135 for aligning the tire 140 with the rim 120. Any other suitable means may be used for securing the tire 140 to the rim 120.

The tire 140 may include a plurality of SMA radial elements 100 extending radially away from the wheel 150 in an arching configuration and radially back toward the wheel. Each SMA radial element has a first end portion, a second end portion, and an arching middle portion connecting the first end portion to the second end portion. Each end of each SMA radial element 100 may be secured to a corresponding rim 120 of the wheel 150. In one embodiment, the ends may be secured via holes 105 in a mounting block 110. The mounting block may be attached to or an integral part of the rim 120. In another embodiment, the SMA radial elements may be directly attached to the rim 120.

As shown in FIGS. 3-9, the SMA radial elements 100 may be positioned about the circumference of the rim 120 in such a way as to impart different characteristics to the resulting tire. For example, the SMA radial elements 100 may be interwoven to enable load sharing between the SMA radial elements.

The SMA radial elements 100 may be any suitable length or gauge. In one embodiment, the tire may include SMA radial elements having different lengths and/or different gauges.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A tire comprising:
   a plurality of radial elements each having a first end portion, a second end portion, and an arching middle portion, wherein the first end portion and the second end portion are connected by the arching middle portion;
   a mounting block securing the first end portion and the second end portion of the plurality of radial elements to form an arch; and
   a selected number of radial elements comprising a shape memory alloy (SMA) having an austenite crystal structure in an ambient condition, and during the application of an externally applied force upon the SMA, the austenite crystal structure of the SMA reorients to a martensitic crystal structure to increase the amount of load carrying potential and accommodate increased deformation without permanent damage.

2. The tire of claim 1 further comprising a flexible construct into which the plurality of radial elements is woven or embedded.

3. The tire of claim 2, wherein the flexible construct is a mesh.

4. The tire of claim 2, wherein the flexible construct is a polymer encasing the plurality of radial elements.

5. The tire of claim 1, wherein the shape memory alloy is selected from NiTi; NiTiX, where X is a ternary alloying addition selected from Hf, Zr, Au, Ag, Pt, Pd, or Fe; NiTiXY (where X and Y are ternary and quaternary alloying additions independently selected from selected from Hf, Zr, Au, Ag, Pt, Pd, or Fe; Ag—Cd; Au—Cd; Cu—Al—Ni; Cu—Sn; Cu—Zn; Fe—Pt; Mn—Cu; Fe—Mn—Si; Co—Ni—Al; Co—Ni—Ga; Ti—Nb; β-Ti alloys; ternary alloys or quaternary alloys of the shape memory alloy; or derivatives thereof.

6. The tire of claim 1, wherein the shape memory alloy is NiTi or its derivatives.

7. The tire of claim 1, wherein the tire can withstand more than 1 percent strain before permanently deforming.

8. The tire of claim 1, where the tire is secured to a rim of a wheel.

9. The tire of claim 8, wherein the tire is secured to the rim of the wheel via the mounting block.

10. The tire of claim 1, wherein the shape memory alloy displays a shape memory effect that is thermally induced.

11. The tire of claim 1, wherein the tire is a superelastic tire.

12. A wheel and tire assembly comprising a plurality of radial elements, each radial element comprising:
    a plurality of radial elements having a first end portion, a second end portion, and an arching middle portion, wherein the first end portion and the second end portion are secured to different positions on the wheel to form an arch; and
    a selected number of radial elements comprising a shape memory alloy (SMA) having an austenite crystal structure in an ambient condition, and during the application of an externally applied force upon the SMA, the austenite crystal structure of the SMA reorients to a martensitic crystal structure to increase the amount of load carrying potential and accommodate increased deformation without permanent damage.

13. The wheel and tire assembly of claim 12, wherein the first end portion and the second end portion are secured directly to a rim of the wheel.

14. The wheel and tire assembly of claim 12, wherein the first and end portion and the second portion are secured to the wheel by a mounting block.

15. The wheel and tire assembly of claim 14, wherein the mounting block is integrally formed with the wheel.

16. The wheel and tire assembly of claim 12, further comprising multiple sets of radial elements arranged in a manner that produces the effect of multiple plies in a tire.

17. The wheel and tire assembly of claim 12 further comprising a flexible construct that secures the radial elements to form the shape of the tire.

18. The tire of claim 17, wherein the flexible construct is a spring mesh.

19. The tire of claim 12, wherein the shape memory alloy is selected from NiTi; NiTiX, where X is a ternary alloying addition selected from Hf, Zr, Au, Ag, Pt, Pd, or Fe; NiTiXY (where X and Y are ternary and quaternary alloying additions independently selected from selected from Hf, Zr, Au, Ag, Pt, Pd, or Fe; Ag—Cd; Au—Cd; Cu—Al—Ni; Cu—Sn; Cu—Zn; Fe—Pt; Mn—Cu; Fe—Mn—Si; Co—Ni—Al; Co—Ni—Ga; Ti—Nb; β-Ti alloys; ternary alloys or quaternary alloys of the shape memory alloy; or derivatives thereof.

20. The tire of claim 19, wherein the shape memory alloy is NiTi or its derivatives.

* * * * *